(12) United States Patent
Chou et al.

(10) Patent No.: US 12,346,420 B2
(45) Date of Patent: Jul. 1, 2025

(54) METHOD FOR PROTECTING SOFTWARE APPLICATIONS OF ELECTRONIC COMPUTING DEVICES

(71) Applicant: Decentralized Biotechnology Intelligence Co., Ltd., Taipei (TW)

(72) Inventors: Yen-Han Chou, Taipei (TW); Yao-Sheng Chou, Taipei (TW)

(73) Assignee: Decentralized Biotechnology Intelligence Co., Ltd., Taipei (TW)

( * ) Notice: Subject to any disclaimer, the term of this patent is extended or adjusted under 35 U.S.C. 154(b) by 361 days.

(21) Appl. No.: 17/516,651

(22) Filed: Nov. 1, 2021

(65) Prior Publication Data
US 2022/0300590 A1    Sep. 22, 2022

(30) Foreign Application Priority Data

Mar. 22, 2021 (TW) ................................. 110110239

(51) Int. Cl.
*G06F 21/32*  (2013.01)
*G06F 21/62*  (2013.01)
*G06V 40/13*  (2022.01)

(52) U.S. Cl.
CPC .......... *G06F 21/32* (2013.01); *G06F 21/6218* (2013.01); *G06V 40/1306* (2022.01); *G06V 40/1329* (2022.01)

(58) Field of Classification Search
CPC ...................................................... G06F 21/32
See application file for complete search history.

(56) References Cited

U.S. PATENT DOCUMENTS

| | | | |
|---|---|---|---|
| 2015/0193492 A1* | 7/2015 | Gunaratne | G06F 40/166 709/205 |
| 2017/0337413 A1* | 11/2017 | Bhat | G06V 40/1347 |
| 2019/0026527 A1* | 1/2019 | He | G02B 6/0026 |

FOREIGN PATENT DOCUMENTS

WO   WO-2018156338 A1 *  8/2018  ............. G06F 21/32

* cited by examiner

*Primary Examiner* — Bradley W Holder
(74) *Attorney, Agent, or Firm* — Chih Feng Yeh; Yongjean Consulting Inc.

(57) ABSTRACT

A method for protecting application programs of electronic computing devices, which includes arranging a fingerprint detection device at least partially overlapped on the display screen of the electronic computing device, setting a verification area on the display screen to lock or unlock the software applications or files framed by the verification area and to protect the framed software applications or files from unauthorized retrieving.

14 Claims, 7 Drawing Sheets

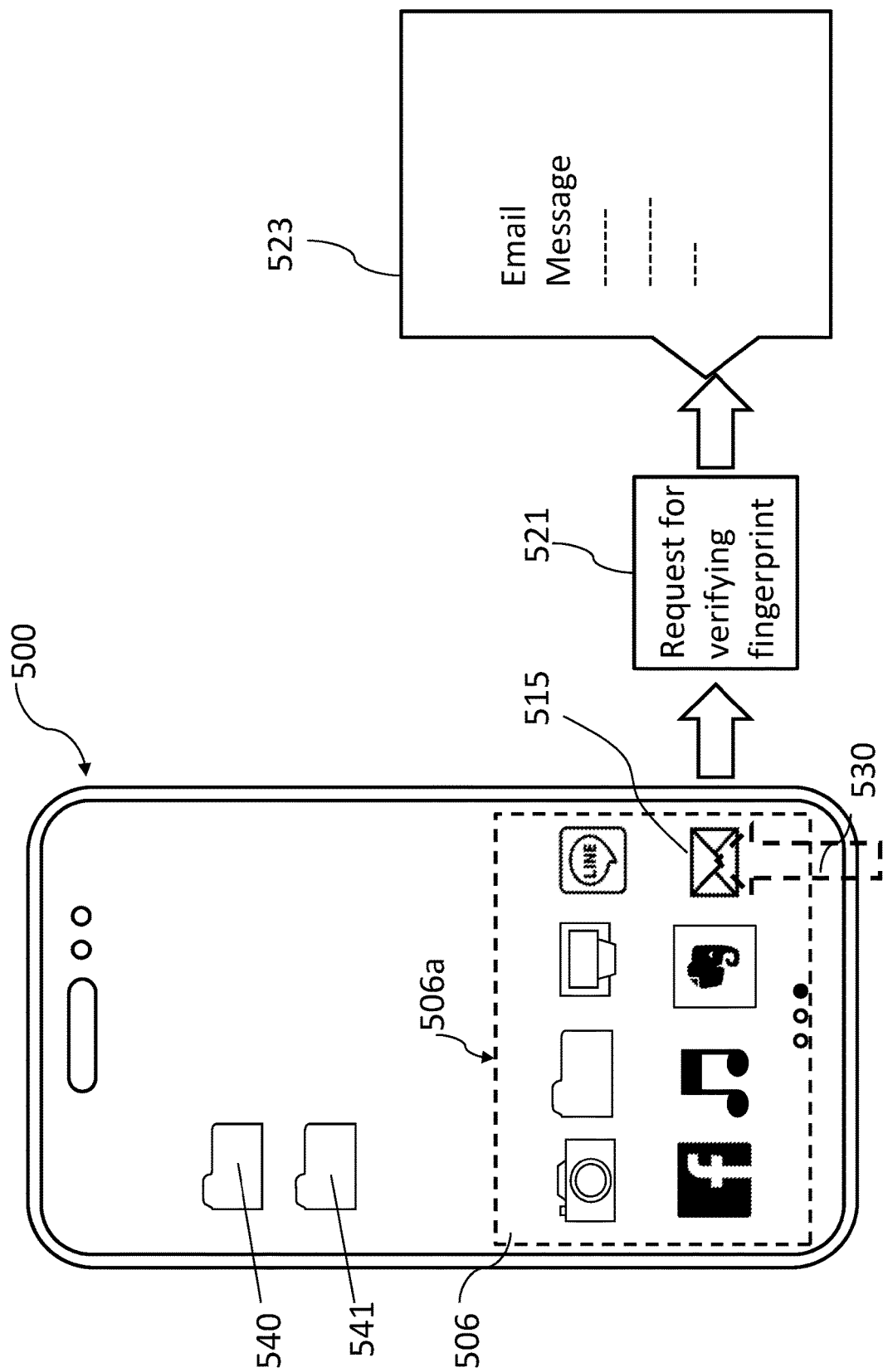

METHOD FOR PROTECTING SOFTWARE APPLICATIONS OF ELECTRONIC COMPUTING DEVICES

CROSS-REFERENCE TO RELATED APPLICATIONS

This patent application is based on, and claim priority from TAIWAN patent application serial number 110110239, filed on Mar. 22, 2015, the disclosure of which is hereby incorporated by reference herein in its' entirety.

TECHNICAL FIELD

The present invention relates to security of electronic computing devices, in particular to a device and method for protecting software applications of the electronic computing devices.

BACKGROUND OF RELATED ARTS

With the continuous development of communication technologies, the functions of electronic computing devices, such as mobile devices, are rapidly improving. These mobile devices are equipped with more and more various software applications (Apps). Among them, most Apps, such as LINE, Email, and electronic payment, need to manually perform the login procedure including input user's name and password first, and then use them after authentication, this login procedure is quite tedious. Some Apps have provided the "remember user password" function, user can log in with one click after these parameters been set, however this login method lacks security, and it is easily been cracked by others. Some important private information that should not be seen could be leaked out and cause unnecessary trouble.

In order to prevent unauthorized users from using electronic computing devices and various Apps installed on these devices, these Apps usually have a first level of protection, which is to lock the screen of the mobile device (using screen saver). Ways of screen locking provided by the vender are nothing more than digital number password setting, fingerprint recognition, face recognition or nine-square pattern setting, etc., all of which can be easily cracked.

In the field of electronic device security, especially for mobile devices or personal electronic computing devices, how to quickly log in to various Apps on the premise of ensuring the security of personal information is a major problem that needs to be solved urgently.

In recent years, due to the development of large-area fingerprint detection technology, this development enables large-area fingerprint detection modules to be specifically integrated with touch screen of the electronic computing devices, such as personal computers, industrial computers, and mobile devices (such as smart phones or tablet computers). It is possible for the above-mentioned electronic computing device to have on-screen fingerprint-on-display (FOD) sensor modules that support multiple fingerprint recognition and further provide a second level of protection.

SUMMARY

The present invention provides a device for protecting software applications (Apps) of an electronic computing device, which includes a fingerprint detection device arranged on the display screen of the electronic computing device, the fingerprint detection device having a protective cover and a plurality of capacitive fingerprint sensors arranged below it, wherein the fingerprint detection device having fingerprint sensing area fully or partly covers the display, and the plurality of capacitive fingerprint sensors are connected to an internal controller circuit of the electronic computing device through wiring of a connected flexible circuit.

In one preferred embodiment, the electronic computing device is a personal computer, an industrial computer, a smart phone, a tablet computer, a portable multimedia device, a personal digital assistant, or a similar electronic computing device.

The present invention provides a method for protecting Apps of an electronic computing device, which includes arranging a fingerprint detection device at least partially overlapped on the display screen of the electronic computing device, setting a verification area on the display screen by a process of the electronic computing device to lock or unlock the Apps or files framed by the verification area and to protect the framed Apps or files from unauthorized retrieving.

In one preferred embodiment, the step of setting the verification area includes activating the fingerprint detection device by the process, performing fingerprint setting by the fingerprint detection device, framed selected the Apps or files into the verification area by the process, and locking the verification area by the process.

In one preferred embodiment, it further includes a step of performing individual fingerprint settings for specific Apps or files selected from the framed Apps or files to lock the specific Apps or files before the verification area been locked.

In one preferred embodiment, the step of activating the fingerprint detection device is to press coordinate position on the display screen of the electronic computing device for a period of time, and a pressure sensed by a pressure sensor located below the display screen must greater than a threshold value to be able to activate the fingerprint detection device, then the fingerprint detection device will be awakened from its sleep state.

In one preferred embodiment, the step of performing fingerprint setting includes using the fingerprint detection device to perform fingerprints scan and a designated fingerprint combination scan.

In one preferred embodiment, the step of performing security protection on the Apps or files been framed includes performing individual fingerprint settings on the specific Apps or files selected from the Apps or files been framed to lock the specific Apps or files.

In one preferred embodiment, the method for protecting Apps of an electronic computing device further comprises a step of unlocking the display screen of the electronic computing device to provide double protection.

In one preferred embodiment, the method for locking and unlocking the display screen of the electronic computing device includes digital number password setting, fingerprint recognition, face recognition, or nine-square pattern setting.

In one preferred embodiment, scanning frequencies for unlocking the display screen and unlocking the Apps or files are different.

In one preferred embodiment, scanning potentials for unlocking the display screen and unlocking the Apps or files are different.

BRIEF DESCRIPTION OF THE DRAWINGS

The components, characteristics and advantages of the present invention may be understood by the detailed descriptions of the preferred embodiments outlined in the specification and the drawings attached:

FIGS. 5(A)-5(B) illustrate various demonstrations of performing functions of an electronic computing device according to a preferred embodiment of the present invention.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

In recent years, due to the development of large-area fingerprint detection technology, this development enables the large-area fingerprint detection modules can be integrated with touch screen of electronic computing devices, such as personal computers, industrial computers, and mobile devices (such as smart phones or tablets computers). It is possible for the electronic computing devices, such as personal computers, industrial computers, and mobile devices (for example, smart phones or tablet computers), to have on-screen fingerprint-on-display (FOD) sensor modules that support multiple fingerprint recognition. Therefore, the user's fingerprints (part or overall) of different fingers can be sensed at any position on the screen, and a variety of fingerprint combinations can be used as user's input fingerprint settings. Therefore, a second, a third level or even a next level of further protection for the electronic computing device can be implemented.

Figure 1:
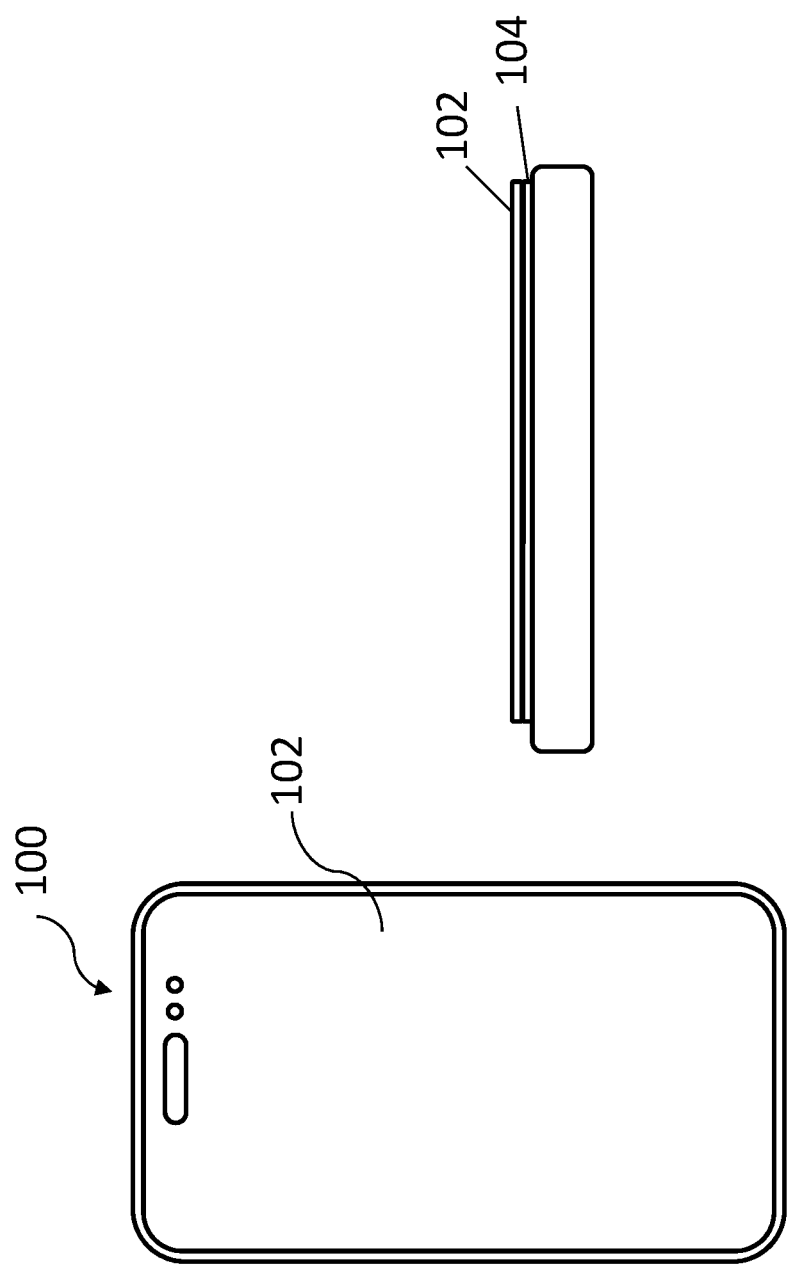
FIGS. 1-2 illustrate schematic diagram of the appearance of an electronic computing device integrated with a fingerprint recognition sensor module according to a preferred embodiment of the invention.
Figure 2:
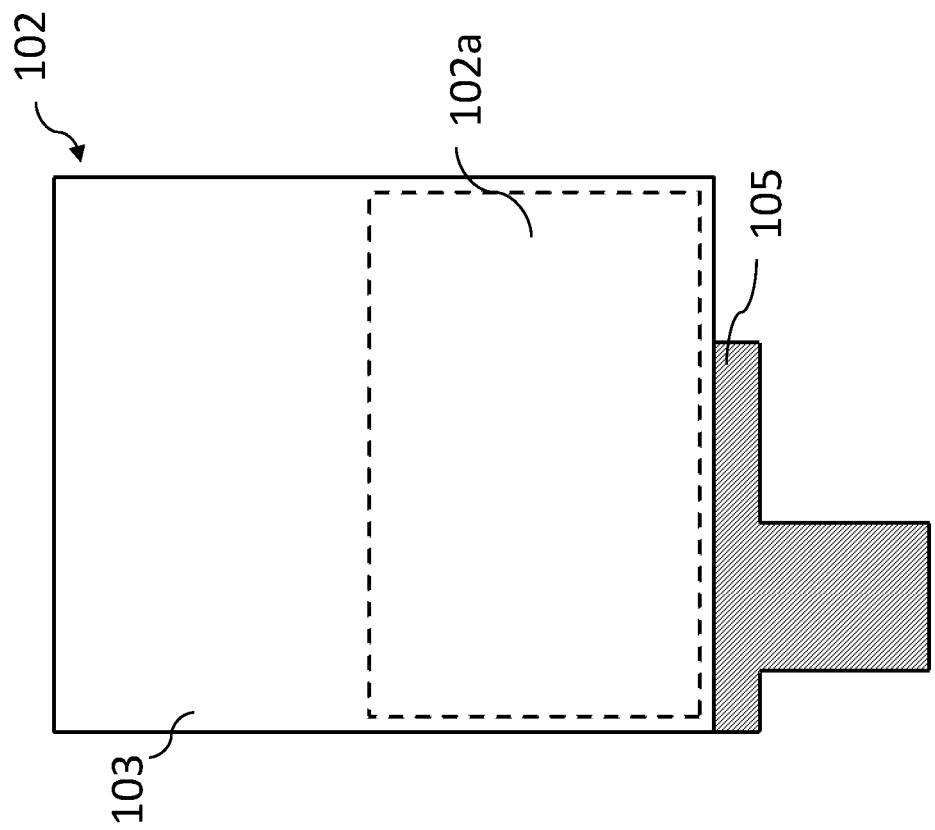

Referring to FIGS. 1-2, which show a schematic diagram of the appearance of an electronic computing device integrated with a fingerprint recognition sensor module according to a preferred embodiment of the present invention, the electronic computing device (such as a smart phone or a tablet computer) 100 is integrated with a large area fingerprint detection device 102. As shown in the right of FIG. 1, the fingerprint detection device 102 is directly disposed on the touch screen 104 of the electronic computing device 100. In a preferred embodiment, the fingerprint detection device 102 is a capacitive fingerprint detection device, which can include a plurality of capacitive fingerprint detection units. In another embodiment, fingerprint detection device 102 can be integrated with the touch screen 104 because their sampling (or detection) frequencies or potentials are different. FIG. 2 shows a possible layout of the fingerprint detection device 102, which includes a protective upper cover 103 and a capacitive fingerprint sensor 102*a* arranged below it, the fingerprint detection device 102 can be connected to a flexible circuit 105 and be wired to the controller circuit inside the mobile device. In addition to the capacitive fingerprint detection implementations mentioned above, the concept that provided by the present invention can also be applied to other full-screen fingerprint recognition methods such as optical or ultrasonic full-screen fingerprint recognition.

Figure 3:
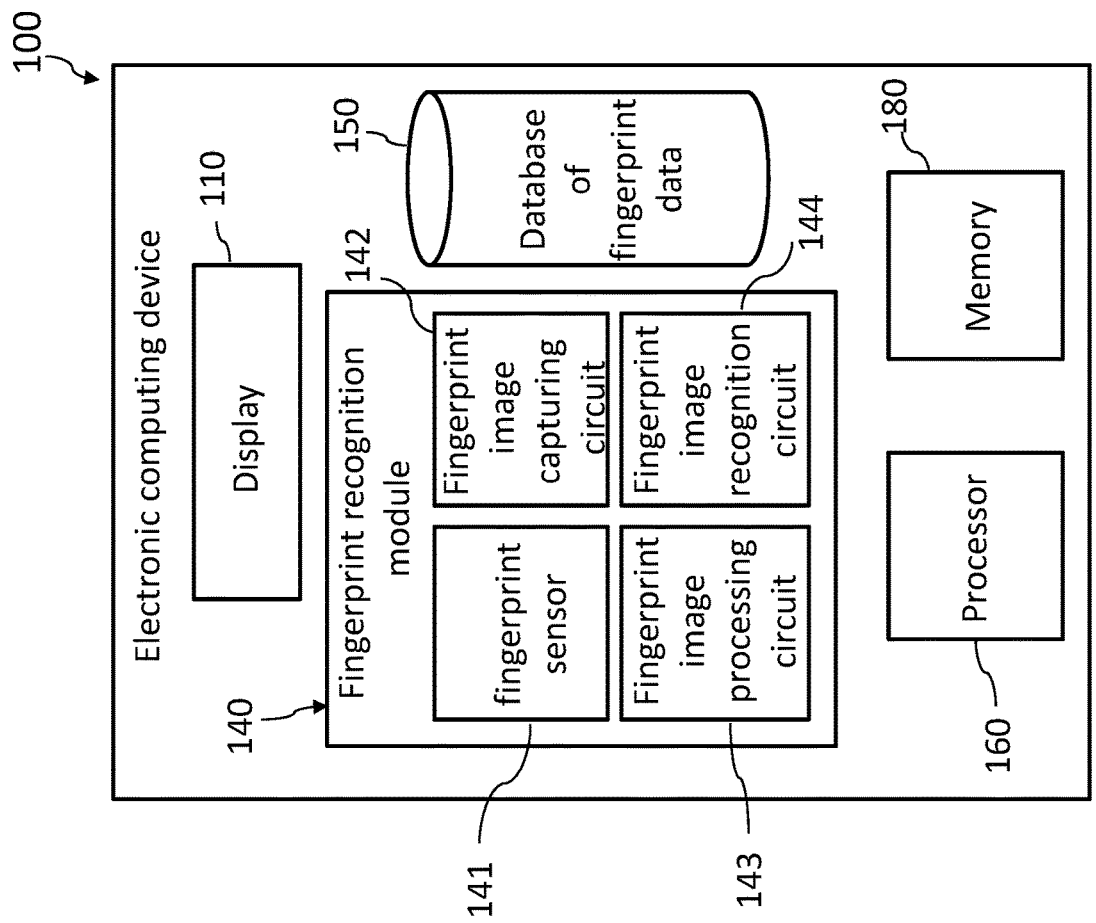
FIG. 3 illustrates the hardware architecture of an electronic computing device that is integrated with fingerprint recognition sensor module according to a preferred embodiment of the present invention.

FIG. 3 shows the hardware architecture of the electronic computing device that integrates with a fingerprint recognition sensor module of the electronic computing device according to the present invention. As shown in FIG. 3, the electronic computing device 100 may be a smart phone, a tablet, a portable multimedia device, a personal computer, an industrial computer, a personal digital assistant (PDA), or other electronic devices alike. The electronic computing device 100 includes a plurality of hardware components configured to perform at least one service, such as accessing Apps, installing Apps, and supporting services associated with these Apps, and configuring multiple drivers for at least one hardware component to provide corresponding services. For example, the display driver is configured to perform display hardware functions. In one embodiment, a plurality of sensors may be integrated on the display 110 to be used individually or collectively to form on-screen fingerprint recognition (FOD) on the display. As a result of forming fingerprint recognition on the display screen, the user's fingerprint (in whole or in part) can be sensed from anywhere on the display 110, and multiple combinations of fingerprints and gestures can be designed for user's input. In another embodiment, the electronic computing device 100 may also include other sensors (not shown), such as an inertial sensor, a micro-electromechanical systems (MEMS) sensor, an accelerometer, etc.

In one embodiment, the display 110 may be configured to display data items of Apps, which include but are not limited to graphic elements (i.e., icons, content, text, images, objects, etc.).

The electronic computing device 100 also includes a gesture recognizer, a region of interest (ROI) detector, which are not shown in the figure, a fingerprint recognition device 140, a database of fingerprint data 150, and a processor 160 (for example, a central processing unit, CPU), a graphics processing unit (GPU), hardware chipsets, etc.) are communicatively coupled to a memory 180 (for example, volatile and/or non-volatile memory).

The fingerprint recognition device 140 is configured to recognize a specific user based on this user's fingerprint data. In one embodiment, the fingerprint recognition device 140 includes at least one fingerprint sensor 141 configured to detect at least one finger gesture provided by the user. In addition, the fingerprint recognition device 140 also includes a fingerprint image capturing circuit 142, a fingerprint image processing circuit 143, and a fingerprint image recognition (fingerprint identification) circuit 144.

The fingerprint image capturing circuit 142 coupled to the fingerprint sensor 141 is configured to capture the fingerprint images that have been recognized by the fingerprint sensor 141.

The fingerprint image recognition circuit 144 is configured to recognize (or indicate) which type of the user's fingers used to input gesture on the display 110, the types of the user's fingers are, for example, index finger, thumb, middle finger, ring finger and little finger. In another embodiment, the fingerprint image recognition circuit 144 is configured to recognize the user based on the fingerprint gesture performed by using which type of finger.

The captured fingerprint images are extracted by the fingerprint image processing circuit 143 to extract image features (that is, key points) of the fingerprint, and store them in the database of fingerprint data 150.

For example, the database of fingerprint data 150 is configured to include fingerprint feature templates, fingerprint index information, etc. associated with each user. Each authorized user of the electronic computing device 100 may have different fingerprint biometric information associated with different activities.

The memory 180 can store various information, including fingerprint data, biometric information, installed Apps, Apps accessed through network devices, and so on. For each user of the electronic device, whose corresponding fingerprint characteristic information can be stored and/or accessed through the memory 180. The fingerprint characteristic information of each authenticated user includes, for example, images, templates, and so on. The fingerprint biometric information can be indexed to quickly determine whether the user's fingerprint is stored in the memory 180.

Figure 4:
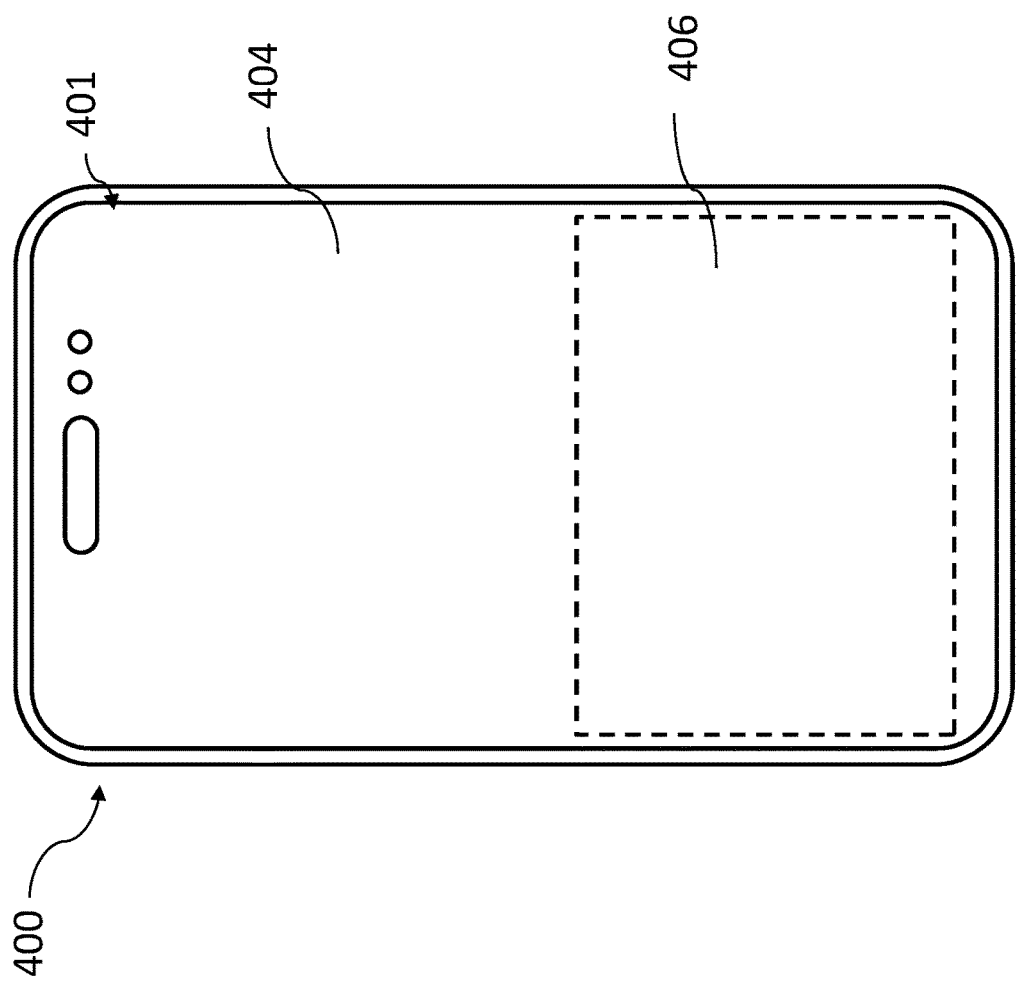
FIG. 4 illustrates a schematic diagram of a possible configuration of the screen area that includes fingerprint sensing area of the display in the electronic computing device according to a preferred embodiment of the present invention.

FIG. 4 shows a schematic diagram of a possible configuration that includes fingerprint sensing area of the display 401 in the electronic computing device 400. The screen area 401 includes a touch screen area (which basically overlaps or mostly overlaps with the screen area, and will not be drawn in detail here) 404 and a fingerprint sensing area 406. The touch screen area 404 is capable of sensing pressure. When the user applies pressure, by hand or stylus, the pressure sensor electrically coupled to the touch screen area 404 can generate the corresponding pressure data and send it to the processor.

The fingerprint sensing area 406 (or fingerprint verification area), in one embodiment, at least partly or fully overlaps the touch screen area 404. Once the user touches or applies pressure to the fingerprint sensing area with his/her finger, the fingerprint sensor electrically coupled to the fingerprint sensing area can generate fingerprint data corresponding to the sensed fingerprints, which can be stored to the memory or the database of fingerprint data for subsequent comparison after the fingerprint data been digitalized processing its characterization.

Next, how to further protect the critical Apps or data files containing confidential information (for example, related to personal information, financial accounts, etc.) installed on the mobile device for a second, third or even deeper level of protection will be described in the following paragraphs for further explanation.

After installing the fingerprint recognition sensor device on the electronic computing device, the user needs to make initial settings for the fingerprint recognition sensor device. First, the original screen unlocking method of the electronic computing device, such as digital number password setting, fingerprint recognition, face recognition, or nine-square pattern setting, is retained as a first layer of protection. However, according to an embodiment of the present invention this step of unlocking the screen of the electronic computing device can also combine the above methods originally provided by the vendor together with fingerprint recognition for double protection, such as setting fingerprint recognition in each digital number input area or nine-square input pattern area. Next step is to perform the setting for the verification area of Apps or folders, which can be activated by a default pressure sensing method. In one embodiment, the verification area can be set by pressing the display of the mobile device at any position for a period of time and then can be activated once the sensed pressure value beyond a threshold value, where the pressure value is sensed by a pressure sensor located below the display screen. After being activated, the fingerprint detection device will be awakened from its sleep state, and the display will graphically show the boundary of the verification area (for example, dotted area as shown in FIG. 4). A following step is to perform fingerprint settings, i.e. utilizing fingerprint detection devices for fingerprint scanning or/and fingerprint combinations setting, for unlocking and comparing of Apps or folders. Then, another follow-up step is to add the Apps or folders that require a high level of security into the verification area, and then set fingerprints individually for those extremely important Apps or folders. For example, unlocking the email App is to verify user's middle finger fingerprint, and unlocking the Face book App is to verify user's index finger fingerprint, etc., and the remaining Apps or folders in the verification area require no further security action. After the activation setting of the verification area is completed, the verification area is activated and locked, and the image that showing the boundary of the verification area is hidden (the fingerprint detection device returns to its sleep state).

In one embodiment, the above-mentioned method for setting a verification area on said display screen can be performed by a process of the electronic computing device to lock or unlock the Apps or files been framed in the verification area and to protect the framed Apps or files from unauthorized retrieving, the process can be, for example, a program or an algorithm stored in the memory that can be executed by the processor of the electronic computing device.

The appearance on the display screen is the same as usual, after the verification area is activated and locked and the image that showing on the boundary of the verification area is then concealed again. However, the Apps or folders in the verification area have been protected. In one embodiment, the Apps or folders that need to be protected should be dragged into the above-mentioned application verification area.

Figure 5A:
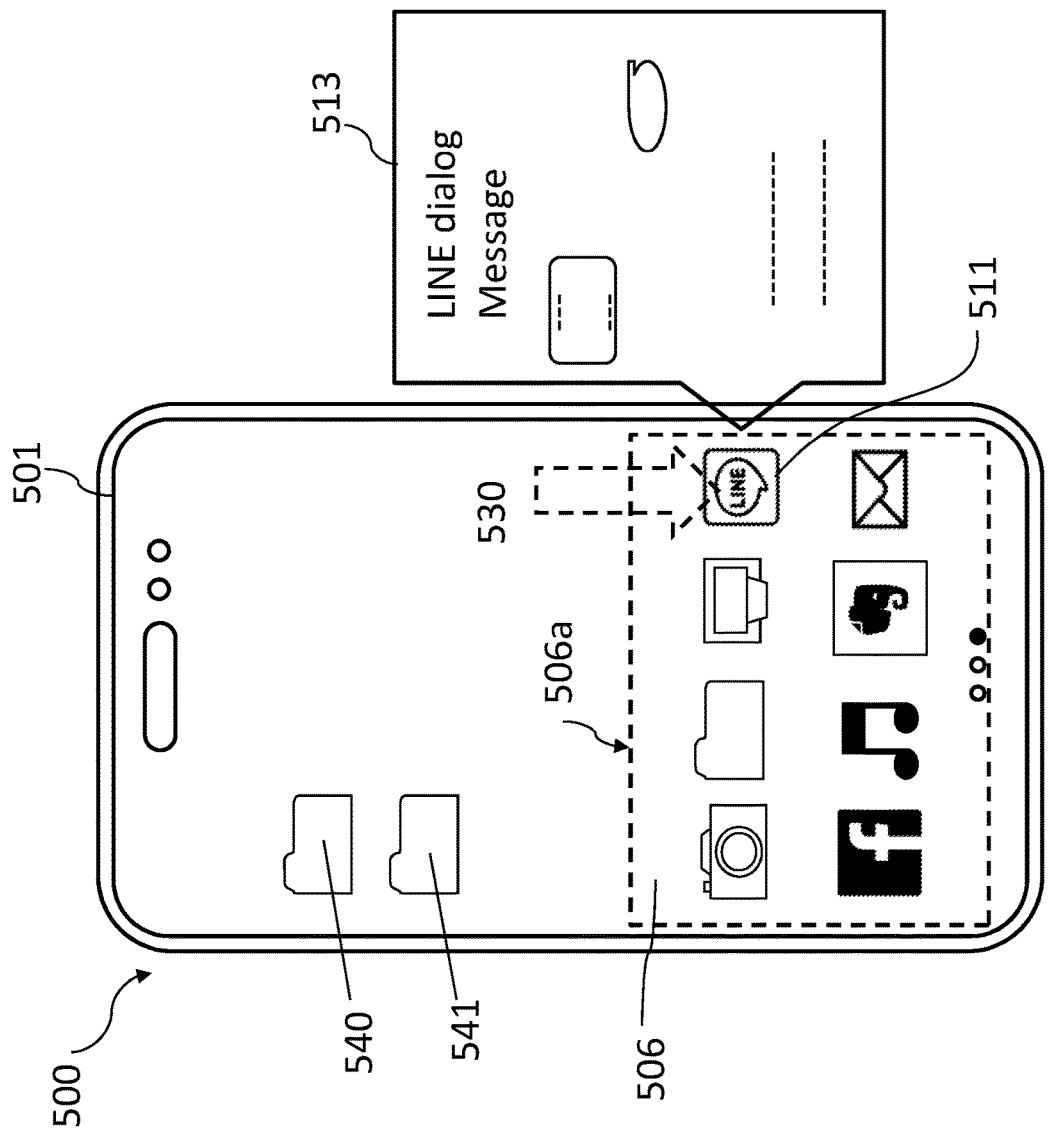

Referring to FIGS. 5(A) and 5(B), various demonstrations of performing functions of the electronic computing device 500 according to the embodiment of the present invention are illustrated. User can perform regular operations on Apps or folders (540, 541) located outside the verification area, after the screen (display) protection of the electronic computing device 500 (the first level of security measures) being unlocked.

When the user wants to operate the Apps or folders located in the verification area, the verification of Apps or files need to be activated first (the image 506a that showing the boundary of the verification area will appear), and then utilizes a preset fingerprint to perform fingerprint verification and unlock them. In one embodiment, while performing fingerprint recognition, the user must press the finger in the verification area 506 with a preset finger, and the fingerprint detection device will scan and detect the fingerprint data. The electronic computing device 500 can compare the captured fingerprint data with the reference fingerprint data stored in the memory by a process, for example a program or an algorithm. When they are matched, the Apps or files can be successfully unlocked.

After the electronic computing device 500 is unlocked, in one embodiment, as long as the Apps or folders are dragged in the verification area 506 in advance, when the user wants to activate or open them, the user just needs to touch the corresponding Apps or folders, the fingerprint verification program will be started immediately. In another embodiment, referring to FIG. 5(A), the user touches the user interface (UI) area 511 (or App icon) included in the screen area 501 through his/her finger 530), that is, the LINE App icon area. When a pressure is applied, or when the UI area 511 is touched by user's finger, the functions of that App can be executed by the electronic computing device 500. For example, the finger 530 presses the App icon area 511, that is, the LINE App can be normally operated. After the finger 530 is pressed on the App icon area 511, the corresponding execution screen 513 of LINE will pop up (the graphic should fill the screen of the electronic computing device, here just showing a simplified schematic drawing).

Referring to FIG. 5(B), if the pressure of the user's finger 530 is applied to the UI area 515, that is, the email App icon area, the electronic computing device 500 can displays the fingerprint identification request UI 521 in the screen area 506 (the verification area). For example, the fingerprint recognition request UI 521 can be displayed on the screen with a pop-up UI, or the fingerprint is directly scanned in the background without sending a request message.

The user can follow the displayed fingerprint identification request UI 521 and touch a part of the verification area 506 with the user's finger. The electronic computing device 500 can obtain fingerprint data by using a fingerprint sensing device. The electronic computing device 500 can compare the obtained fingerprint data with reference fingerprint data that stored. When the comparison result shows that the obtained fingerprint data matches the reference fingerprint data stored, the electronic computing device 500 can perform a designated operation. For example, the electronic computing device 500 can show the graphical execution window 523 of the App corresponding to the touched UI area 515 in the display area.

Figure 6:
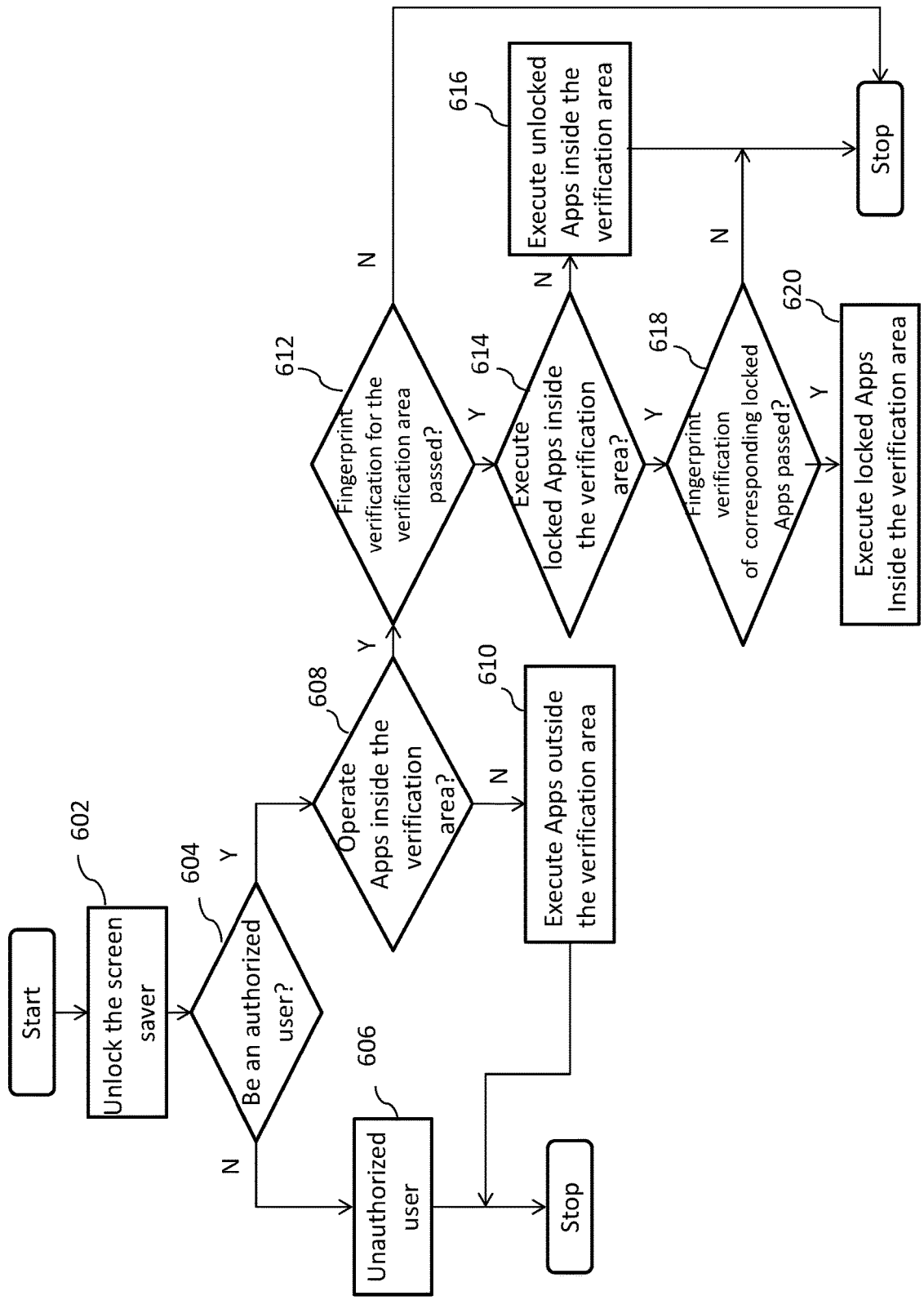
FIG. 6 illustrate a flowchart of a method for a user to execute at least one App on an electronic computing device according to a preferred embodiment of the present invention.

FIG. 6 illustrate a flowchart of a method for a user to execute at least one App on an electronic computing device according to a preferred embodiment of the present invention. First, the user unlocks the screen saver (utilizing the existing unlocking method provided by the electronic computing device) (step 602), then verify whether the user is authorized (step 604), if an unauthorized user is identified (step 606), a notification, for example text messages notifying about password error, unlocking pattern error, vibration alarm, or buzzer alarm is provide to the original user then stop; if the user is identified as an authorized user, justifies whether the user wants to operate the Apps located inside the verification area based on screen area touched by user's finger movement (step 608), if not, i.e., user's finger movement touches screen area outside the verification area, Apps or folders located in this area are allowed to be executed or accessed (step 610); if yes, i.e., user's finger movement touches screen area inside the verification area, verifying whether fingerprint verification of the user inside the verification area is passed (step 612). Once the fingerprint verification of step 612 is passed and the verification area of the screen will be unlocked, checking whether the user wants to execute locked Apps or access locked folders inside the verification area (step 614); if the user wants to execute the locked Apps or access locked folders inside the verification area, it is necessary to pass the fingerprint verification of the corresponding locked Apps or folders (step 618) to unlock the individual Apps or folders and then the locked Apps or folders are allowed to be executed or accessed (step 620); otherwise, the user is only allowed to execute the unlocked Apps or folders inside the verification area. In one embodiment, step 612 is optional, no action about fingerprint verification is taken in the verification area, and directly go to perform fingerprint verification steps about the Apps or folders, i.e. step 618).

Therefore, the method described in steps 608, 612, 614, and 616 in the previous paragraph of this specification provides a second level of security protection for Apps or folders on the electronic computing devices 100, 400, and 500. In addition, the method described in steps 614, 618 and 620 provides a further third level of security protection for Apps or folders on the mobile devices 100, 400, and 500. Based on the above description, if fingerprint verification in the verification area is not performed, two level of protections are provided, depending on the choice of the user or manufacturer.

Following the ideas mentioned in FIGS. 5(A)-(B), FIG. 6 and their related descriptions, with one embodiment of the present invention, it is also possible to perform a next level of security protection for the confidential information of the Apps or folders inside the verification area (for example, some specific text paragraphs in the email content, the confidential information in the file, such as the specific confidential area/columns of the company report, etc.). That is, after step 620 in FIG. 6, fingerprint verification for confidential information/data in the Apps or folder content inside the verification area can be selectively added to provide a fourth level of security protection.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. A method for protecting software applications (Apps) of an electronic computing device having a display screen comprising the following steps:

arranging a fingerprint detection device at least partially overlapped on said display screen of said electronic computing device;

setting a verification area on said display screen by a process of said electronic computing device to lock or unlock said Apps or files been framed in said verification area and to protect said framed Apps or files from unauthorized retrieving, wherein said display screen graphically shows a boundary of said verification area after said verification area being activated, and wherein said boundary is hidden after said process being completed;

unlocking said display screen of said electronic computing device to provide double security protection, wherein said display screen is unlocked by fingerprint recognition, face recognition;

performing security protection on said Apps or files been framed by performing first individual fingerprint and finger gesture settings on specific Apps or files selected from said Apps or files been framed to lock said specific Apps or files;

performing a next level of security protection over confidential information/data of said framed Apps or files by performing second individual fingerprint and finger gesture settings, wherein said confidential information/data of said framed Apps or files include specific text paragraphs in email content or specific confidential area/columns of company report; and wherein said steps of performing said first and said second fingerprint and finger gesture settings include to detect a combination of a gesture and a fingerprint.

2. The method of claim 1, wherein said step of setting said verification area includes:
    activating said fingerprint detection device by said process;
    performing fingerprint setting by said fingerprint detection device;
    framed selected said Apps or files into said verification area by said process; and
    locking said verification area by said process.

3. The method of claim 2, wherein said step of performing said first individual fingerprint and finger gesture settings for said specific Apps or files selected from said framed Apps or files to lock said specific Apps or files is executed before said verification area been locked.

4. The method of claim 2, wherein said step of activating said fingerprint detection device is to press a coordinate position on said display screen of said electronic computing device for a period of time, and a pressure sensed by a pressure sensor located below said display screen must greater than a threshold value to be able to activate said fingerprint detection device, then said fingerprint detection device is awakened from a sleep state.

5. The method of claim 1, wherein said step of unlocking said display screen of said electronic computing device comprises a step of setting digital number password, fingerprint recognition, face recognition, or nine-square pattern.

6. The method of claim 1, wherein said electronic computing device is a personal computer, an industrial computer, a smart phone, a tablet computer, a portable multimedia device, a personal digital assistant, or a similar electronic computing device.

7. A method for protecting software applications (Apps) of an electronic computing device having a display screen comprising the following steps:
    arranging a fingerprint detection device at least partially overlapped on said display screen of said electronic computing device;
    setting a verification area on said display screen by a process of said electronic computing device to lock or unlock said Apps or files been framed in said verification area and to protect said framed Apps or files from unauthorized retrieving;
    performing security protection on said Apps or files been framed by performing first individual fingerprint and gesture settings on said specific Apps or files selected from said Apps or file been framed to lock said specific Apps or files; and
    performing a next level of security protection over confidential information/data of said framed Apps or files by performing second individual fingerprint and gesture settings, wherein said confidential information/data of said framed Apps or files include specific text paragraphs in email content or specific confidential area/columns of company report, wherein said steps of performing said first and said second fingerprint and finger gesture settings include to detect a combination of a gesture and a fingerprint.

8. The method of claim 7, wherein said step of setting said verification area includes:
    activating said fingerprint detection device;
    performing fingerprint setting by said fingerprint detection device;
    framed selected said Apps or files into said verification area by said process; and
    locking said verification area by said process.

9. The method of claim 8, wherein said step of performing individual fingerprint settings for said specific Apps or files selected from said framed Apps or files to lock said specific Apps or files is executed before said verification area been locked.

10. The method of claim 8, wherein said step of activating said fingerprint detection device is to press a coordinate position on said display screen of said electronic computing device for a period of time, and a pressure sensed by a pressure sensor located below said display screen must greater than a threshold value to be able to activate said fingerprint detection device, then said fingerprint detection device is awakened from a sleep state.

11. The method of claim 8, wherein said step of performing fingerprint setting includes using the fingerprint detection device to perform fingerprints scan and a designated fingerprint combination scan.

12. The method of claim 7, further comprising a step of unlocking said display screen of said electronic computing device.

13. The method of claim 12, wherein said step of unlocking said display screen of said electronic computing device comprises a step of setting digital number password, fingerprint recognition, face recognition, or nine-square pattern.

14. The method of claim 12, wherein scanning frequencies for unlocking said display screen and unlocking said Apps or files are different.

* * * * *